United States Patent [19]
Jo

[11] Patent Number: 6,039,321
[45] Date of Patent: Mar. 21, 2000

[54] PISTON RING DEVICE FOR USE IN A COMBUSTION ENGINE OF A VEHICLE

[75] Inventor: Sung Hwan Jo, Kyunggi-Do, Rep. of Korea

[73] Assignee: Hyundai Motor Company, Ltd., Seoul, Rep. of Korea

[21] Appl. No.: 08/958,980

[22] Filed: Oct. 28, 1997

[51] Int. Cl.[7] .................................................. F16J 9/00
[52] U.S. Cl. .......................... 277/435; 277/452; 277/457
[58] Field of Search ..................... 277/435, 452, 277/453, 457, 473, 480, 489, 491, 492

[56] References Cited

U.S. PATENT DOCUMENTS

| | | | |
|---|---|---|---|
| 1,419,672 | 6/1922 | Heslewood et al. | 277/480 |
| 2,079,977 | 5/1937 | Wenzel | 277/453 |
| 2,233,723 | 3/1941 | Ballard | 277/491 |
| 2,299,963 | 10/1942 | Crawford et al. | 277/480 |
| 2,460,431 | 2/1949 | Phillips | 277/480 |
| 2,579,698 | 12/1951 | Phillips | 277/480 |
| 2,712,971 | 7/1955 | Phillips | 277/444 |
| 2,757,994 | 8/1956 | Synder | 277/491 |
| 2,815,996 | 12/1957 | Phillips | 277/480 |
| 2,958,564 | 11/1960 | Ramirez, Sr. | 277/453 |
| 3,921,988 | 11/1975 | Prasse et al. | 277/452 X |

FOREIGN PATENT DOCUMENTS 1000644A  3/1983  U.S.S.R. ................. 277/473

*Primary Examiner*—Anthony Knight
*Assistant Examiner*—Mark Williams
*Attorney, Agent, or Firm*—Birch, Stewart, Kolasch & Birch, LLP

[57] ABSTRACT

A piston ring device for use in a combustion engine of a vehicle includes a compressing ring, a zigzag-shape oil ring and an auxiliary ring which is piled up from the auxiliary ring and combined with each other, so that the piston ring device can be easily assembled and disassembled and reducing a rubbing loss so as to minimize any power loss.

8 Claims, 1 Drawing Sheet

PISTON RING DEVICE FOR USE IN A COMBUSTION ENGINE OF A VEHICLE

BACKGROUND OF THE INVENTION

1. Field of the Invention

The present invention relates to a piston ring device for use in a combustion engine of a vehicle and more particularly to a combined compression ring and oil ring which provides easily assembly and disassembly, and also reduces rubbing loss which, in turn, minimizes power loss.

2. Description of Related Art

Various types of piston ring devices for use in the combustion engine of a vehicle are known in the art. Generally, a combustion engine of a vehicle produces power by causing the combustion of a fuel-air mixture in the combustion chamber. That is, the combustion in the engine causes the piston to move up and down in the cylinder. The up and down (vertical) movement is converted by a crank to revolutional movement, and thus, a firm contacting relationship between the piston and the cylinder must be continuously maintained. Accordingly, in conventional devices, a plurality of piston rings are utilized to maintain a firm relationship between the cylinder and the piston.

As shown in FIG. 1, a conventional piston ring utilizes a pair of compression rings 108 and 110 disposed in a pair of compression ring gloves 102 and 104, respectively, and also an oil ring 112 disposed in an oil ring groove 106 for firmly contacting and sealing the piston 100 with the inner wall of the cylinder 101. The device may include four piston rings. The pair of compression rings 108 and 110 prevent the creation of a blow-by of the expanding gas, and the oil ring 112 prevents engine oil from entering into the combustion chamber.

However, such a conventional piston ring system suffers from a number of problems. For example, since three rings 108, 110 and 112 are independent, it is difficult to assemble and disassemble three separate rings 108, 110 and 112, which introduces power loss and an overall bad influence to the piston which becomes light because each of the rings 108, 110 and 112 are rubbed independently.

SUMMARY OF THE INVENTION

Accordingly, it is an object of the present invention to provide a piston ring device for use in a combustion engine of a vehicle, which eliminates the above problems encountered with conventional piston ring devices.

Another object of the present invention is to provide a piston ring device for use in a combustion engine of a vehicle which includes a compression ring combined with an oil ring as a composite structure which is disposed in a ring groove of a piston, providing easy assembly and disassembly, and reducing the rubbing loss so as to minimize power loss.

Still another object of the present invention is to provide a piston ring device for use in a combustion engine of a vehicle, which is simple in structure, durable, inexpensive to manufacture, and easy to assemble and disassemble.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a piston ring system for use in a combustion engine of a vehicle which includes a compression ring, a zigzag-shape oil ring and an auxiliary ring which are stacked together and combine with each other, so that they can be easily assembled and disassembled for reducing rubbing loss and minimizing power loss.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
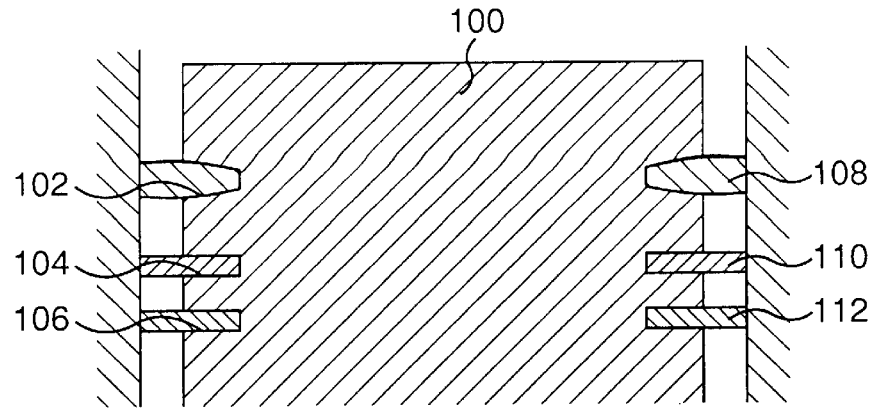
FIG. 1 is a sectional view of a conventional piston-ring system used in a combustion engine of a vehicle.
Figure 2:
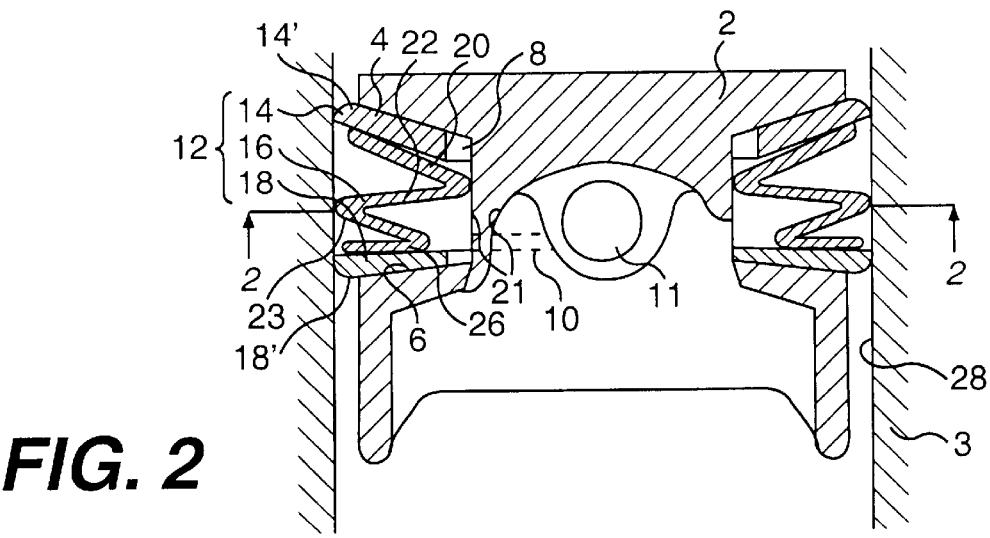
FIG. 2 is a sectional view of a piston-ring system for use in a combustion engine of a vehicle according to the present invention.
Figure 3:
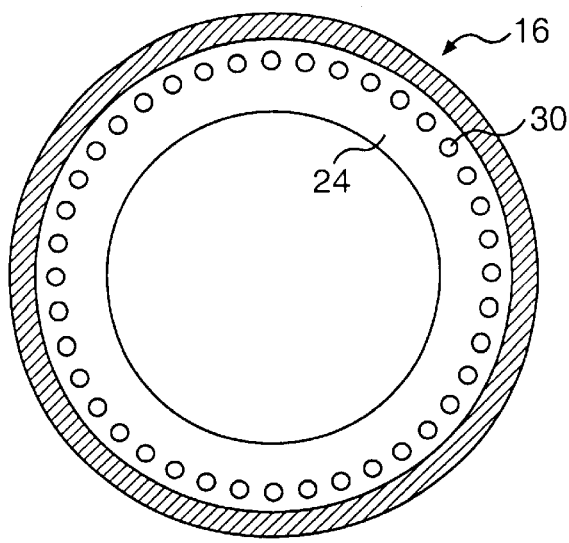
FIG. 3 is a cross-sectional view of FIG. 2, taken along line 2—2 of FIG. 2.

Referring now in detail to the drawings for the purpose of illustrating preferred embodiments of the present invention, the piston ring device for use in a combustion engine of a vehicle, as shown in FIGS. 2 and 3, comprises a piston ring 12 including a compression ring 14, a zigzag shaped oil ring 16 and an auxiliary ring 18 which are disposed in a stacked relationship starting from the auxiliary ring 18 and are combined with each other as a composite structure.

The piston 2 which is disposed within the cylinder wall 28 of the cylinder 3 for use in a combustion engine of a vehicle (not shown) contains a tapered, annular ring groove 8 disposed at the upper, circumferential portion thereof for slidably receiving the piston ring 12 and contains the compression ring 14, the zigzag shape ring 16 and the auxiliary ring 18. The piston 2 is made of an aluminum alloy which is light, durable and heat-resistant. The tapered ring groove 8 has a pair of outwardly sloping faces 4 and 6, and further has an oil outlet orifice 10 communicating with a center aperture 11 of the piston for discharging oil from a plurality of oil apertures 30 (FIG. 3) disposed in the zigzag shaped oil ring 16 of the piston ring 12.

As shown in FIG. 2, the compression ring 14 contains a round end portion 14' at the most circumferential end thereof and is gradually decreased in thickness toward said end. The zigzag or serpentine shaped oil ring 16 contains a first outward slope portion 20, a second inward slope portion 22, a third outward slope portion 24 and a fourth inward slope portion 26. An inward connection portion 21 disposed between the first and second slope portions 20 and 22 extends inwardly to engage the wall 4 of the ring groove 8 and an outward connecting portion 23 between the third and fourth sloping portions 24 and 26 is outwardly extended to engage the wall 28 of the cylinder 3.

As shown in FIG. 2, the auxiliary ring 18 is made of a heat-conductive material for conducting heat from the piston 2 to the wall 28 of the cylinder 3 and maintaining a firm relationship between the piston 2 and the cylinder 3. The auxiliary ring 18 contains a round end 18' at the most circumferential end thereof with a gradually increased thickness for reducing the rubbing effect between the piston 2 and the cylinder 3.

The serpentine or zigzag shaped oil ring 16 is attached to the compression ring 14 and the auxiliary ring 18 at the first slope portion 20 and the fourth slope portion 26 by any suitable means such as by welding, or the like. Therefore, the compression ring 14, the zigzag ring 16, and the auxiliary ring 18 are a composite structure, so that the piston ring 12 can be easily assembled and disassembled, while effectively reducing rubbing and minimizing power loss.

The piston ring device according to the present invention functions as follows. First of all, the compression force of the expanding gas produced by the combustion of the air-fuel mixture distributes pressure to the compression ring 14. At that time, the compression ring 14 is retained in position and the compression force distributes pressure to the first slope portion 20 of the ring 16. The third slope portion 24 is maintained in a horizontal state by the pressure force of the first slope portion 20 for adhering to the wall 4 of the ring groove 8 and the wall 28 of the cylinder 3 at the contacting portions 21 and 23. Therefore, both contacting end portions 21 and 23 scrape out the oil on the wall 28 of the cylinder 3 and the oil between the second and third slope portions 22 and 23, and the collected oil is supplied to a space between the third and fourth sloping parts for increasing the lubrication thereof. Thereafter, the oil is discharged through the oil outlet apertures 30.

That is, the second slope portion 20 can slidably adhere to the wall of the cylinder 3 when the combustion engine processes the compression and explosion operations so as to maintain a firmly adhering relationship of the piston 2 and cylinder 3. But in the absorption and exhaustion operations of the combustion engine, the piston 2 can reduce the rubbing loss so as to minimize the power loss.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. A piston ring system of an internal combustion engine comprising:
   a cylinder;
   a piston being disposed within said cylinder;
   a ring groove being disposed around said piston, said ring groove including a first side wall, a second side wall, and an end wall; and
   a piston ring disposed within said ring groove, said piston ring including a compression ring portion, an oil ring portion, and an auxiliary ring portion, said oil ring portion including means for expanding and contracting said oil ring portion, said expanding and contracting means contacting said cylinder and said end wall during a power stroke of said piston, said expanding and contracting moving away from a cylinder wall during an exhausts stroke of said piston, said expanding and contracting means including a serpentine configuration biasing said compression ring portion and said auxiliary ring portion, said serpentine configuration comprising a first slope portion, a second slope portion and a third slope portion, wherein the compression ring can distribute pressure to the first slope portion so that only the first slope portion can move to slidably adhere to a wall of the cylinder during compression and explosion operations, whereby power loss due to contact of said piston ring with said cylinder is substantially minimized during exhaust strokes of said piston.

2. The piston ring system of claim 1, wherein said compression ring portion, said oil ring portion, and said auxiliary ring portion have rounded end portions which engage the cylindrical wall and the end wall of the ring groove.

3. The piston ring system of claim 1, wherein said oil ring portion is disposed between said compression ring portion and said auxiliary ring portion.

4. The piston ring system of claim 1, wherein said oil ring portion is attached to said compression ring portion and said auxiliary ring portion.

5. The piston ring system of claim 1, wherein said first and second side walls of said ring groove converge at an angle towards said end wall.

6. The piston ring system of claim 1, wherein said compression ring portion contacts said first side wall and said auxiliary ring portion contacts said second side wall, said oil ring portion is disposed between and connected to said compression ring portion and said auxiliary ring portion.

7. The piston ring system of claim 1, wherein said oil ring is provided with a plurality of oil apertures, whereby oil scraped by said oil ring is discharged through said apertures.

8. The piston ring system of claim 1, wherein said serpentine configuration includes substantially Z-shaped cross sections, where said Z-shaped cross sections increase in size from said second wall to said first wall.

* * * * *